United States Patent
Lee

(10) Patent No.: US 9,411,700 B2
(45) Date of Patent: Aug. 9, 2016

(54) STORAGE TESTER CAPABLE OF INDIVIDUAL CONTROL FOR A PLURALITY OF STORAGE

(71) Applicant: UNITEST INC., Gyeonggi-do (KR)

(72) Inventor: Eui Won Lee, Gyeonggi-do (KR)

(73) Assignee: UNITEST INC., Yongin-si, Gyeonggi-do (KR)

( * ) Notice: Subject to any disclaimer, the term of this patent is extended or adjusted under 35 U.S.C. 154(b) by 96 days.

(21) Appl. No.: 14/453,654

(22) Filed: Aug. 7, 2014

(65) Prior Publication Data

US 2015/0067418 A1    Mar. 5, 2015

(30) Foreign Application Priority Data

Aug. 29, 2013  (KR) .................... 10-2013-0103034

(51) Int. Cl.
*G11C 29/00* (2006.01)
*G06F 11/263* (2006.01)

(52) U.S. Cl.
CPC .................... *G06F 11/263* (2013.01)

(58) Field of Classification Search
CPC combination set(s) only.
See application file for complete search history.

(56) References Cited

U.S. PATENT DOCUMENTS

2012/0239976 A1*  9/2012  Cometti ................ G11C 16/26
                                                    714/24
2014/0236526 A1*  8/2014  Frediani ............ G01R 31/2834
                                                    702/119

FOREIGN PATENT DOCUMENTS

KR    10-2007-0068149 A    6/2007
KR    10-2010-0114697 A    10/2010
KR       10-1240633 B1      3/2013

OTHER PUBLICATIONS

Korean Office Action dated Jan. 20, 2015.

* cited by examiner

*Primary Examiner* — Guerrier Merant
(74) *Attorney, Agent, or Firm* — Rabin & Berdo, P.C.

(57) ABSTRACT

Disclosed is a storage tester capable of individual control for a plurality of storages, which comprises a host terminal for receiving user's control signal for storage test; a communication interface unit transmitting data among the host terminal, an embedded processor and a data engine unit; a data engine unit for generating pattern data and command data and reading the data from the storage; a sequence control module for controlling respectively a plurality of SATA/SAS/PCIe interface units; and SATA/SAS/PCIe interface unit for connecting to the storage through one among SATA, SAS, PCIe interface according to the signal for interface selection generated from the embedded processor and controlling a plurality of storages according to control of the sequence control module by the embedded processor in order to test respectively connected storage.

7 Claims, 5 Drawing Sheets

STORAGE TESTER CAPABLE OF INDIVIDUAL CONTROL FOR A PLURALITY OF STORAGE

BACKGROUND OF THE INVENTION

1. Field of the Invention

The present invention relates to a storage tester, in particular, to a storage tester which can operate a respective test for storage differently through a plurality of sequence control modules controlling a plurality of SATA/SAS/PCIe.

2. Description of the Related Art

A hard disc (HDD) is generally known and used as mass digital media storage until the present.

However, as recently lowered is the price of NAND flash semiconductor device which can keep storing data without power and store the largest capacity of storage among semiconductors having memory function, a mass digital media storage such as SSD using semiconductors having memory function is newly emerging.

The function of SSD is realized through a SSD tester, a conventional SSD tester for testing the said SSD is shown in FIG. 1.

As shown in FIG. 1, a host terminal 100, network 200, a communication interface unit 300, memory 400, an embedded processor 500, a data engine unit 600, and SATA/SAS/PCIe interface unit 700 comprise a single FPGA or one chip.

Herein, when the host terminal 100 sends macro command for testing storage 10 through network 200 and the communication interface unit 300 to the embedded processor 500, the embedded processor 500 writes data in the storage 10 by sending command to the data engine unit 600 and the SATA/SAS/PCIe interface unit 700, etc., reads written data, compares those with expected values, determines pass/fail of storage 10 and transmits the result to the host terminal 100.

Also, the communication interface unit 300 serves for interface enabling to transceive data among the host terminal 100, one of the embedded processor 500, the data engine unit 600 and SATA/SAS/PCIe interface unit 700.

And also the embedded processor 500 as a microprocessor realized inside FPGA or ASIC chip controls the data engine unit 600, SATA/SAS/PCIe interface unit 700, etc., and serves for controlling in order to test storage using the data engine unit 600, SATA/SAS/PCIe interface unit 700, etc.

Also, the data engine unit 600 generates pattern data, command data, and etc. on real time, and reads data from the storage 10 on real time, and compares those with pattern data generated in the data engine and stores in fail memory.

And SATA/SAS/PCIe interface unit 700 enables data to be recorded in and read from the storage 10 using interface needed for corresponding to the storage interface.

On the other hand, there is prior art related to a device for testing storage filed or disclosed such as Korea patent publication No. 10-2010-0114697 (hereinafter called "cited reference"), and etc.

The cited reference as mentioned above comprises a storage interface unit for managing interface with the storage; user interface unit for receiving test condition from user for storage test; a test pattern generation unit for generating test pattern for storage test corresponding to the test condition received from the user; and a test control unit for controlling the storage test through the test pattern.

In the prior art including the cited reference, a single embedded processor is used to control a plurality of SATA/SAS/PCIe interface unit. Accordingly the embedded processor has too much burden for controlling a plurality of SATA/SAS/PCIe interface units and it takes longer time for processing.

It doesn't become a big problem in transmitting the same control command simultaneously to a plurality of SATA/SAS/PCIe interface units and checking individual condition of each SATA/SAS/PCIe interface unit.

However, if different control instructions are transmitted to a plurality of SATA/SAS/PCIe interface units respectively at different point of time using a single embedded processor, test requires more time.

Thus, in order to solve this problem, a plurality of embedded processors can be used in transmitting respectively different control instructions to a plurality of SATA/SAS/PCIe interface unit, or it can be implemented to design a sequence control module for controlling a plurality of SATA/SAS/PCIe interface units using user logic by using a single embedded processor and the user logic.

Here, a method controlling a plurality of SATA/SAS/PCIe interface units using a plurality of embedded processors is difficult to implement in practice because the method requires the large number of gates in embedded processors, and additional peripherals and the size of logic is increased.

SUMMARY OF THE INVENTION

The present invention relates to a storage tester which has been devised in response to various problems above and provides a storage tester capable of individual control for a plurality of storages enabling to decrease time for storage test by controlling respectively a plurality of SATA/SAS/PCIe interface through a plurality of sequence control modules in testing a plurality of storages using a single embedded processor.

The present invention relates to, in particular, a storage tester which can operate a respective test differently through a plurality of sequence control modules controlling a plurality of SATA/SAS/PCIe.

In order to achieve this technical matter, the present invention relates to a storage tester capable of individual control for a plurality of storages, and comprises a host terminal for receiving user's control signal for storage test; a communication interface unit serving for interface enabling to transceive data among the host terminal, an embedded processor, and a data engine unit; the embedded processor controlling the data engine unit and a sequence control unit for testing the plurality of storages; a data engine unit for generating pattern data to be written in the storage and command data for control of SATA/SAS/PCIe interface unit on real time, and reading the written result pattern data from the storage to compare the formed pattern data; the sequence control module for controlling respectively a plurality of SATA/SAS/PCIe interface units according to command received from the embedded processor; and SATA/SAS/PCIe interface unit configured in plurality for connecting to the storage through one among SATA, SAS, PCIe interface according to the signal for interface selection generated from the embedded processor, and controlling a plurality of storages according to control of the sequence control module by the embedded processor in order to test respectively connected storage.

Also the embedded processor controls in order to generate test pattern corresponding to user's test condition through the data engine unit, and generates a data write command for the storage through the sequence control module, and selects interface according to the interface type of the storage to be tested through the SATA/SAS/PCIe interface unit, and controls in order to test the storage based on test pattern and receives the result.

And the data engine unit comprises a pattern data generation module for generating pattern data to be written in the storage, transmitting those to the embedded processor, the sequence control module, and SATA/SAS/PCIe interface unit, and receiving pattern result data written in the storage based on command received from the embedded processor; a command generation module for generating command data for control of SATA/SAS/PCIe interface unit based on the command received from the embedded processor and transmitting to the embedded processor, the sequence control module and SATA/SAS/PCIe interface unit; and a data comparison module for receiving pattern result data written in the storage from SATA/SAS/PCIe interface unit and comparing them by channel with pattern data generated by the pattern data generation module to determine pass or fail and store the determined result, and transmitting the stored information to the host terminal through the communication interface unit and network.

Also the pattern data generation module is characterized by receiving pattern data from the host terminal and the signal for pattern data selection from the embedded processor.

And the sequence control module is characterized by comprising an embedded processor interface module for transmitting command received from the embedded processor to the sequence control module; and a plurality of sequence control modules configured to connect to a plurality of SATA/SAS/PCIe interface units for transmitting respectively command to a plurality of SATA/SAS/PCIe interface units in case command is received from the embedded processor interface module.

Also the embedded processor interface module generates data write control command for address and the storage for each sequence control module according to received command, and transmits command to the sequence control module specified by corresponding address.

And the sequence control module generates command list and command table in order to write data in the storage and receive by reading data so as to operate the SATA/SAS/PCIe interface unit, and sets needed register before checking if the specified amount of data is transmitted to the storage.

And the SATA/SAS/PCIe interface unit comprises, AHCI (Advanced Host Controller Interface) module for writing and reading data for the storage from the sequence control module; DMA (Direct Memory Access) module for receiving pattern data to be written in the storage from the sequence control module and receiving pattern result data written in the storage and transmitting those to the sequence control module; SATA interface module for supporting SATA (Serial-ATA) interface among AHCI (Advanced Host Controller Interface) module, DMA (Direct Memory Access) module, and the storage; SAS interface module for supporting SAS (Serial Attached SCSI) interface among AHCI (Advanced Host Controller Interface) module, DMA (Direct Memory Access) module, and the storage; PCIe interface module for supporting PCIe (PCI express) interface among AHCI (Advanced Host Controller Interface) module, DMA (Direct Memory Access) module, and the storage; and a multiplexer (MUX) for connecting the storage to the embedded processor by selecting one among SATA interface module, SAS interface module, PCIe interface module according to the signal for interface selection, and transmitting/receiving data for storage test.

According to the present invention, the sequence control module is used for controlling SATA/SAS/PCIe interface unit, which is effective in reducing overall testing time.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF SPECIFIC EMBODIMENTS

Hereinafter, a detailed description will be given of the present invention.

Figure 1:
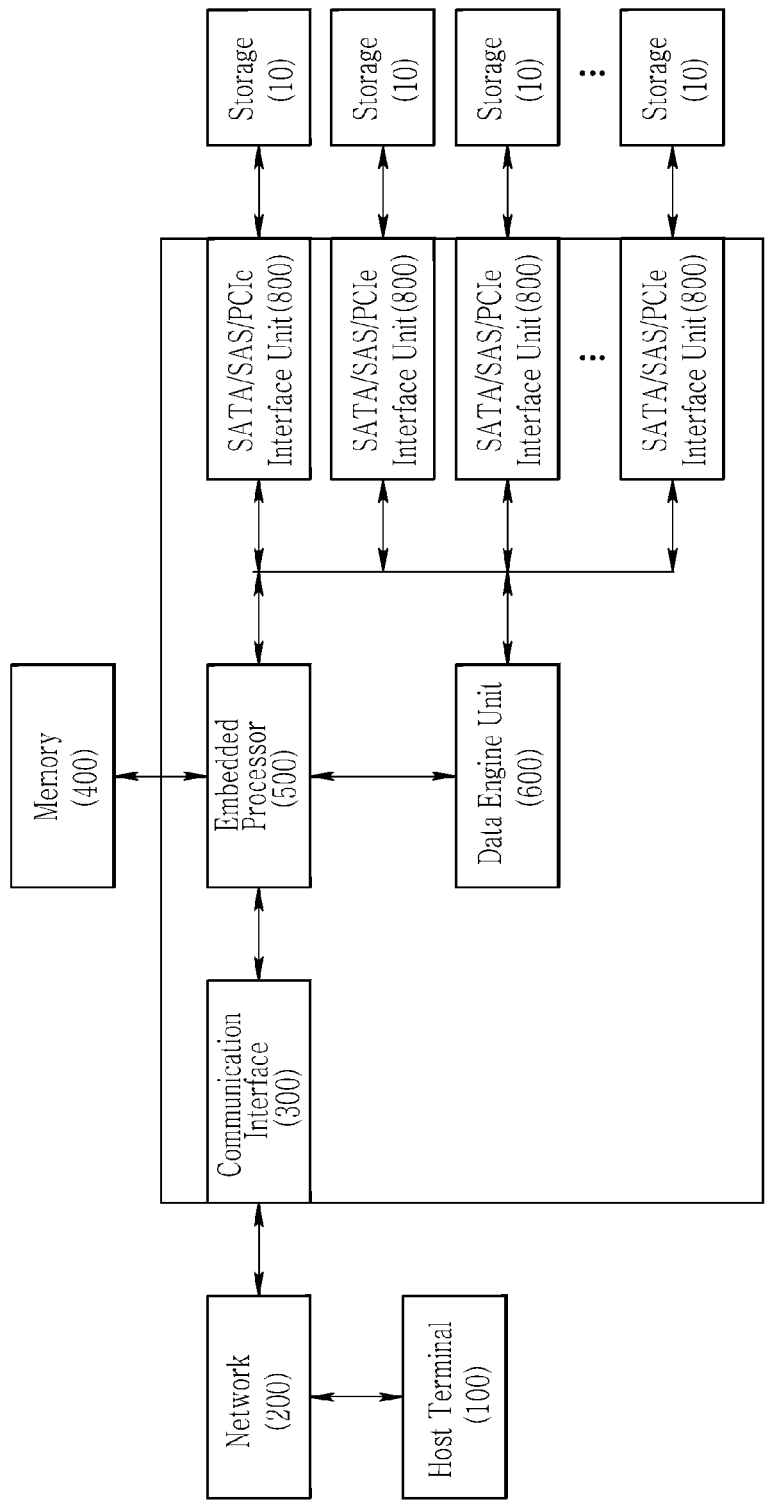
FIG. 1 is a configuration diagram of a test equipment according to the prior art.
Figure 2:
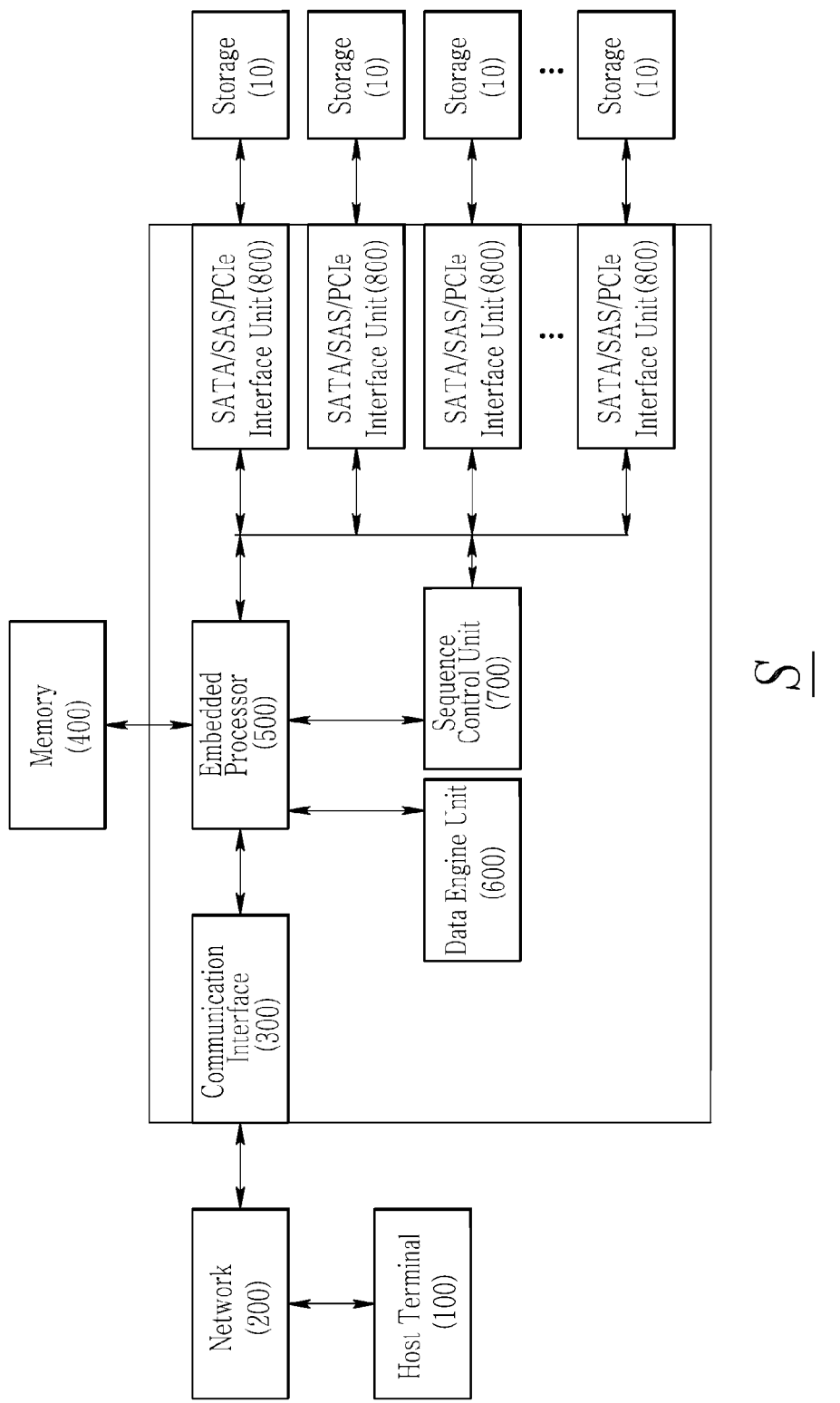
FIG. 2 is an overall configuration diagram of a storage tester capable of individual control for a plurality of storages.

FIG. 2 is the overall configuration diagram of a storage tester capable of individual control for a plurality of storages which comprises a host terminal 100, network 200, a communication interface unit 300, memory 400, an embedded processor 500, a data engine unit 600, a sequence control module 700 and SATA/SAS/PCIe interface unit 800.

The host terminal 100 receives user's control signal for testing storage 10, network 200 serves for data interface between the host terminal 100, and a communication interface unit 300, and the communication interface 300 serves for interface in order to transceive data among the host terminal 100, the embedded processor 500, the data engine unit 600, and test program is stored in memory 400.

The embedded processor 500 controls the data engine unit 600 and the sequence control unit 700 for testing the storage 10.

Specifically, the embedded processor 500 controls in order to generate test pattern corresponding to user's test condition through the data engine unit 600, and controls in order to generate a data write command for storage through the sequence control module 700, and selects interface according to the interface type of the storage to be tested through the SATA/SAS/PCIe interface unit 800, and controls in order to test storage 10 according to the test pattern and receives the result.

Figure 3:
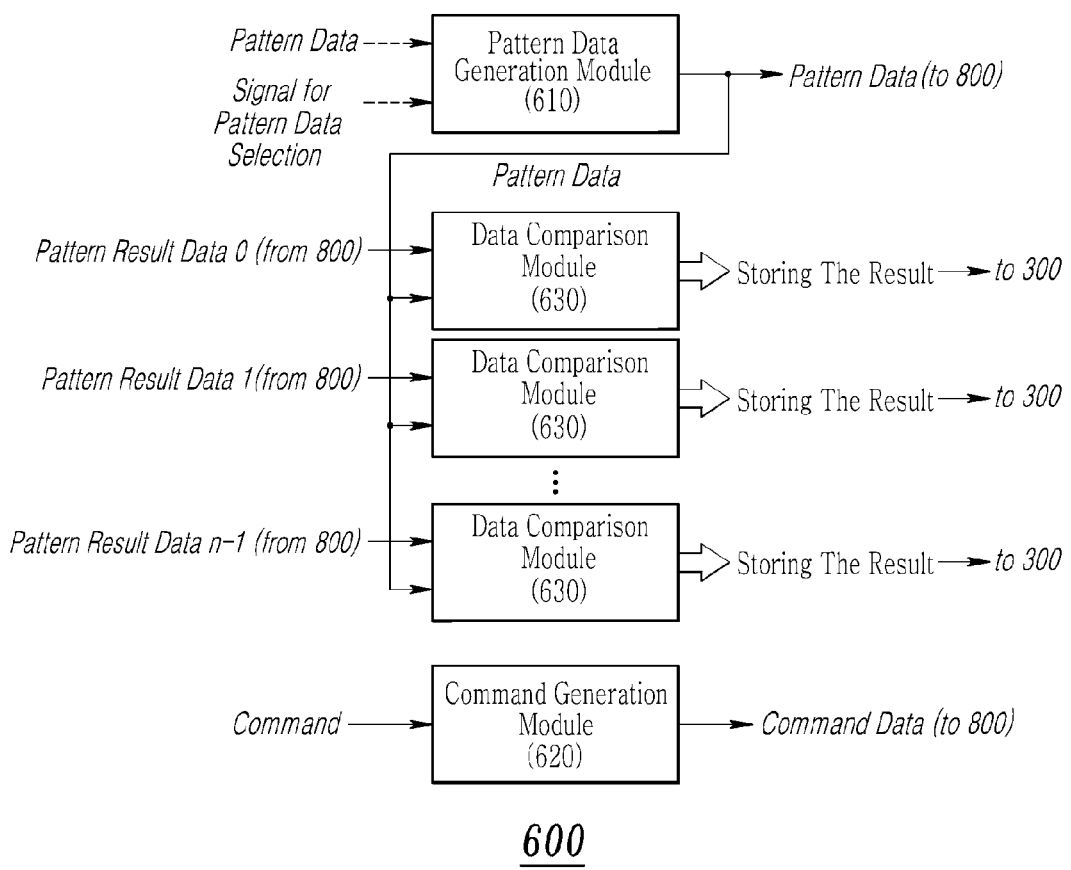
FIG. 3 is a detailed configuration diagram of a data engine unit.

The data engine 600 unit generates the pattern data to be written in the storage 10 and the command data for controlling SATA/SAS/PCIe interface unit 800 on real time, reads the written result pattern data from the storage, compares those with the generated pattern data, and comprises a pattern generation module 610, a command generation module 620, and a data comparison module 630 as shown FIG. 3.

Specifically, the pattern data generation module 610, based on command received from the embedded processor 500, generates pattern data to be written in the storage 10, transmits those to the embedded processor 500, the sequence control module 700, and the SATA/SAS/PCIe interface unit 800, and receives pattern result data written in the storage 10. Herein, the pattern data can be received from the host terminal 100, and the pattern data selection signal can be received from the embedded processor 500.

The command generation module 620, based on command received from the embedded processor 500, generates command data for controlling the SATA/SAS/PCIe interface unit 800, and transmits those to the embedded processor 500, the sequence control module 700, and the SATA/SAS/PCIe interface unit 800.

The data comparison module 630 receives pattern result data written in the storage 10 from the SATA/SAS/PCIe interface unit 800, compares those by channel with pattern data generated through the pattern data generation module 610 to determine pass or fail and store the determined result, and transmits the stored information to the host terminal 100 through the communication interface 300 and the network 200.

Figure 4:
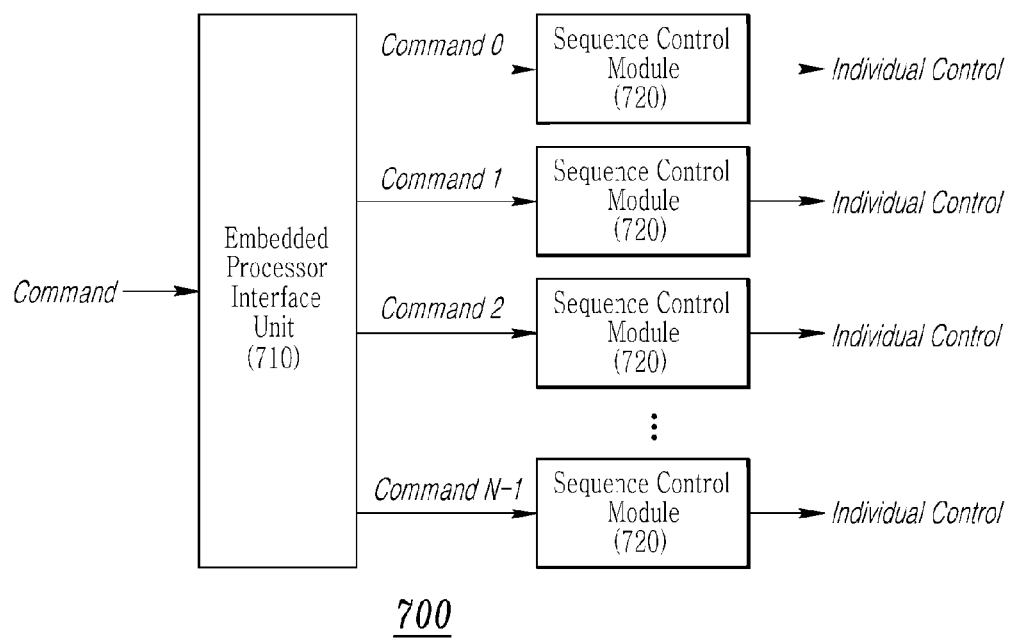
FIG. 4 is a detailed configuration diagram of a sequence control module.

The sequence control module 700 according to command data received from the embedded processor 500 controls respectively a plurality of SATA/SAS/PCIe interface units 800, and comprises an embedded processor interface module 710 and a plurality of sequence control modules 720 as shown in FIG. 4.

Specifically, the embedded processor interface module 710 transmits command received from the embedded processor 500 to the sequence control module 720.

Herein the embedded processor interface module 710 according to the received command can generate data write control signal for address and storage 10 for each sequence control module 720, and transmit command to the sequence control module 720 specified by corresponding address.

A plurality of sequence control module 720 are respectively connected to a plurality of SATA/SAS/PCIe interface units 800, in case command is received through the embedded processor interface module 710, transmit respectively command to a plurality of SATA/SAS/PCIe interface unit 800, generate command list and command table to write data in the storage and receive by reading data in order to operate the SATA/SAS/PCIe interface unit 800, set needed register before checking if the specified amount of data is transmitted to the storage 10.

On the other hand, the control flow of the sequence control module 720 for controlling storage 10 with SATA interface is described in detail as following.

Register of SATA interface in the data engine unit 600 is initialized, and the command list and the command table are generated according to the command received from the embedded processor 500. And, generated commands are transmitted to SATA interface module 830 of SATA/SAS/PCIe interface unit 800 through AHCI (Advanced Host Controller Interface) module 810 register and SATA interface module 830 is prepared to operate.

When setting CI (command issue) register after setting AHCI (Advanced Host Controller Interface) module 810 register, SATA interface module 830 is operated in accordance with setting commands.

Later, in order to check if the command transmitted to SATA interface module 830 is completed, CI register is read to check if command is transmitted.

If the command transmitted to SATA interface module 830 is completed, it is checked if the command is transmitted to storage 10 by reading RFIS (Read FIS).

When it is checked, the command is transmitted properly, an error does not occur. In case an error does not occur, it is checked if the specified amount of data are transmitted (or received). If all the data are transmitted (or received), the sequence control module 720 completes the process and waits for the next command from the embedded processor 500. If an error occurs when RFIS (Read FIS) is read, it is checked if it can be recovered and it is retried.

If the error is recoverable, it goes back to the initial state to execute the command. But if the error is not recoverable, the process is finished and an error message is sent to the embedded processor 500.

If this operation is done by the embedded processor 500, SATA/SAS/PCIe interface unit 800 in other channels cannot be controlled while the command for writing data in the storage 10 of one channel is generated, the register is set and it is checked if all the data are transmitted. Thus, there will be time loss. The loss of time is increased as the number of storage 10 to be controlled is increased.

Figure 5:
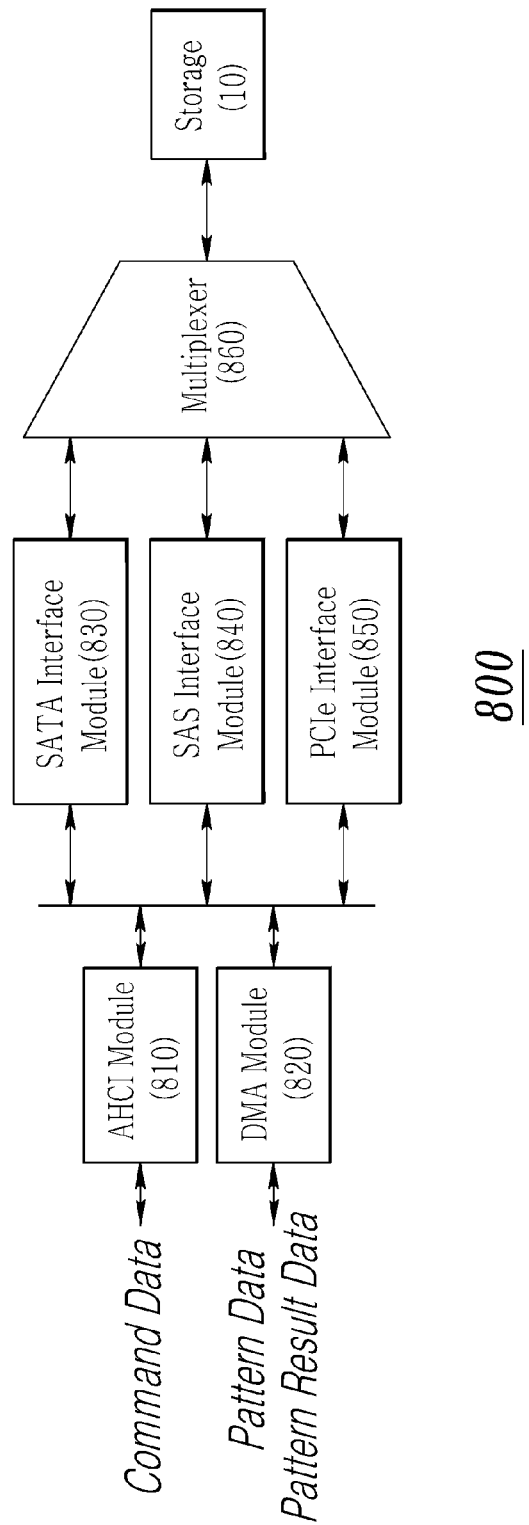
FIG. 5 is a detailed configuration diagram of SATA/SAS/PCIe unit.

SATA/SAS/PCIe interface unit 800 is configured in plurality, and connected to storage according to the signal of interface selection generated by the embedded processor 500 through one of SATA/SAS/PCIe interface. And SATA/SAS/PCIe interface unit 800 control a plurality of storages 10 according to the control of the sequence control module 700 by the embedded processor 500 so that connected storage 10 can be tested, and comprise AHCI (advanced host controller interface) module 810, DMA (direct memory access) module 820, SATA interface module 830, SAS interface module 840, PCIe interface module 850, and multiplexer 860 as shown in FIG. 5.

Specifically, AHCI (Advanced Host Controller Interface) module 810 receives command data from the sequence control module 700 enabling to write and read the data for the storage 10.

DMA (Direct Memory Access) module 820 receives the pattern data to be written in the storage from the sequence control module 700, receives the pattern result data written in the storage 10 and transmits those to the sequence control module 700.

SATA interface module 830 supports SATA (Serial-ATA) interface among AHCI (Advanced Host Controller Interface) module 810, DMA (Direct Memory Access) module 820, and the storage 10.

SAS interface module 840 supports SAS (Serial Attached SCSI) interface among AHCI (Advanced Host Controller Interface) module 810, DMA (Direct Memory Access) module 820, and storage 10.

PCIe interface module 850 supports PCIe (PCI express) interface among AHCI (Advanced Host Controller Interface) module 810, DMA (Direct Memory Access) module 820, and the storage 10.

Multiplexer (MUX) 860 connects storage 10 to embedded processor 500 by selecting one among SATA interface module 830, SAS interface module 840, and PCIe interface module 850 according to the signal for interface selection generated by the embedded processor 500, transceives data for storage test.

As described above, the present invention is not limited by the embodiments and the accompanying drawings. Possible for a large number of changes and modifications to the category of the technical idea disclosed in the present invention without departing from the present invention to those skilled in the art will be able to understand better. Appropriate, all such changes and modifications and equivalents as fall within the scope of the invention, therefore, can be considered.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A storage tester capable of individual control of a plurality of storages, comprising:

a host terminal for receiving user's control signal for storage test;
a communication interface unit for serving as an interface to transceive data among the host terminal, an embedded processor, and a data engine unit;
the embedded processor controlling the data engine unit and a sequence control unit for testing the plurality of storages;
the data engine unit for generating pattern data to be written in the plurality of storages and command data for controlling a plurality of memory interface units, reading written result pattern data from the plurality of storages, and comparing the written result pattern data with the pattern data, the data engine unit including
a pattern data generation module for generating the pattern data, transmitting the pattern data to the embedded processor, the sequence control unit and the plurality of memory interface units, and receiving the written result pattern data from the plurality of storages,
a command generation module for generating the command data for controlling the plurality of memory interface units, and transmitting the command data to the embedded processor, the sequence control unit and the plurality of memory interface units, and
a data comparison module for receiving the written result pattern data from each of the plurality of memory interface units, comparing the written result pattern data with the pattern data to obtain a result of the storage test, and storing the result and transmitting the result to the host terminal through the communication interface unit;
the sequence control unit for controlling individually the plurality of memory interface units according to the command data received from the embedded processor; and
the plurality of memory interface units controlling the plurality of storages individually according to control of the sequence control unit, each of the plurality of memory interface units including a serial advanced technology attachment (SATA) interface module, a serial attached small computer system (SAS) interface module and a peripheral component interconnect express (PCIe) interface module, and connecting the embedded processor and the sequence control unit to one of the plurality of storages through one of the SATA, SAS and PCIe interface modules according to an interface selection signal generated from the embedded processor.

2. The storage tester of claim 1, wherein the embedded processor generates the pattern data corresponding to the user's control signal through the data engine unit, generates a data write command for the plurality of storages through the sequence control unit, selects an interface module among the SATA, SAS and PCIe interface modules according to an interface type of a corresponding storage to be tested and receives a test result.

3. The storage tester of claim 1, wherein the pattern data generation module receives the pattern data from the host terminal, and receives a pattern data selection signal from the embedded processor.

4. The storage tester of claim 1, wherein the sequence control unit comprises
a plurality of sequence control modules connected with the plurality of memory interface units one to one and transmitting the command data to the plurality of memory interface units, and
an embedded processor interface module for transmitting the command data received from the embedded processor to the plurality of sequence control modules.

5. The storage tester of claim 4, wherein the embedded processor interface module further designates an address of one of the plurality of sequence control modules and outputs a data write command to a corresponding storage specified by the address.

6. The storage tester of claim 4, wherein the plurality of sequence control modules generate a command list and a command table in order to operate the memory interface units by writing data in a corresponding storage and receiving by reading, and checks if a specified amount of data is transmitted after setting needed registers.

7. The storage tester of claim 1, wherein said each of the memory interface units comprises
an AHCI (Advanced Host Controller Interface) module for receiving the command data enabling to write and read data for a corresponding storage from the sequence control unit;
a DMA (Direct Memory Access) module for receiving the pattern data to be written in the corresponding storage from the sequence control unit, receiving the written result pattern data from the corresponding storage and transmitting the written result pattern data to the sequence control unit;
the SATA interface module for supporting a SATA (Serial-ATA) interface among the AHCI (Advanced Host Controller Interface) module, the DMA (Direct Memory Access) module and the corresponding storage;
the SAS interface module for supporting a SAS (Serial Attached SCSI) interface among the AHCI (Advanced Host Controller Interface) module, the DMA (Direct Memory Access) module and the corresponding storage;
the PCIe interface module for supporting a PCIe (PCI express) interface among the AHCI (Advanced Host Controller Interface) module, the DMA (Direct Memory Access) module and storage; and
a multiplexer (MUX) for selecting one among the SATA interface module, the SAS interface module, and the PCIe interface module according to the interface selection signal, connecting the selected one to the corresponding storage, and transceiving the data for storage test.

* * * * *